United States Patent
Wang et al.

(10) Patent No.: US 12,150,015 B2
(45) Date of Patent: Nov. 19, 2024

(54) DATA RETRANSMISSION METHOD AND APPARATUS, AND TERMINAL DEVICE

(71) Applicant: GUANGDONG OPPO MOBILE TELECOMMUNICATIONS CORP., LTD., Dongguan (CN)

(72) Inventors: Shukun Wang, Dongguan (CN); Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 503 days.

(21) Appl. No.: 17/696,773

(22) Filed: Mar. 16, 2022

(65) Prior Publication Data

US 2022/0210616 A1 Jun. 30, 2022

Related U.S. Application Data

(63) Continuation of application No. PCT/CN2019/106504, filed on Sep. 18, 2019.

(51) Int. Cl.
| | |
|---|---|
| *H04W 4/06* | (2009.01) |
| *H04W 24/08* | (2009.01) |
| *H04W 56/00* | (2009.01) |
| *H04W 72/0446* | (2023.01) |
| *H04W 72/23* | (2023.01) |

(52) U.S. Cl.
CPC ............ *H04W 4/06* (2013.01); *H04W 24/08* (2013.01); *H04W 56/001* (2013.01); *H04W 72/0446* (2013.01); *H04W 72/23* (2023.01)

(58) Field of Classification Search
CPC ... H04W 4/06; H04W 72/23; H04W 72/0446; H04W 24/08; H04W 56/001
See application file for complete search history.

(56) References Cited

U.S. PATENT DOCUMENTS

| | | | |
|---|---|---|---|
| 2018/0368084 A1 | 12/2018 | Ko et al. | |
| 2020/0053670 A1* | 2/2020 | Jung | H04W 56/0015 |
| 2020/0351818 A1* | 11/2020 | Park | H04W 4/90 |

FOREIGN PATENT DOCUMENTS

| | | | | |
|---|---|---|---|---|
| CN | 101841772 A | * | 9/2010 | |
| CN | 107734646 A | | 2/2018 | |
| CN | 109600831 A | | 4/2019 | |
| CN | 109716843 A | * | 5/2019 | ....... H04L 27/26025 |

OTHER PUBLICATIONS

International Search Report and the Written Opinion Dated Jun. 18, 2020 From the International Searching Authority Re. Application No. PCT/CN2019/106504.
3GPP, "Technical Specification Group Services and System Aspects", 3GPP TR 21.915 V0.2.0, Jul. 2018.

\* cited by examiner

*Primary Examiner* — Saad A. Waqas
(74) *Attorney, Agent, or Firm* — Quarles & Brady LLP

(57) ABSTRACT

A data retransmission method includes a terminal device determining a correspondence between a physical downlink control channel (PDCCH) monitor occasion and a synchronization signal block (SSB) and the terminal device receiving at least one multimedia broadcast multicast service (MBMS) service transmission within a first time range based on the correspondence between the PDCCH monitor occasion and the SSB.

18 Claims, 13 Drawing Sheets

(a) No duplicate transmissions (b) Repeat transmission according to manner 1

(c) Repeat transmission according to manner 2

DATA RETRANSMISSION METHOD AND APPARATUS, AND TERMINAL DEVICE

CROSS REFERENCE

This application is a continuation of an International Application No. PCT/CN2019/106504, entitled "DATA RETRANSMISSION METHOD AND APPARATUS, AND TERMINAL DEVICE", filed on Sep. 18, 2019, which is incorporated by reference in the present application in its entirety.

TECHNICAL FIELD

The embodiments of the present application relate to the field of communication technology, and more particularly, to a data retransmission method and apparatus, and a terminal device.

BACKGROUND

Multimedia broadcast multicast service (MBMS) is a technology that transmits data from one data source to multiple users by sharing network resources. This technology can effectively utilize network resources while providing multimedia services and realize broadcast and multicast of multimedia services at higher rates (e.g., 256 kbps).

In a new radio (NR) system, many scenarios need to support service requirements of multicast and broadcast, such as internet of vehicles, industrial internet, and so on. Therefore, it is necessary to introduce MBMS in NR. NR MBMS uses beam sweeping transmission on an air interface, and it needs to be clarified how to effectively receive MBMS services.

SUMMARY

Embodiments of the present application provide a data retransmission method and apparatus, and a terminal device.

Embodiments of the present application provide a data retransmission method, comprising:

a terminal device determining a correspondence between a physical downlink control channel (PDCCH) monitor occasion and a synchronization signal block (SSB);

the terminal device receiving at least one multimedia broadcast multicast service (MBMS) service transmission within a first time range based on the correspondence between the PDCCH monitor occasion and the SSB.

Embodiments of the present application provide a data retransmission apparatus, comprising:

a determination unit configured to determine a correspondence between a PDCCH monitor occasion and an SSB;

a receiver configured to receive at least one MBMS service transmission within a first time range based on the correspondence between the PDCCH monitor occasion and the SSB.

Embodiments of the present application provide a terminal device comprising a processor and a memory. The memory is used to store a computer program, and the processor is configured to call and run the computer program stored in the memory to perform the above-mentioned data retransmission method.

Embodiments of the present application provide a chip used to perform the above data retransmission method.

In details, the chip comprises a processor for calling and running a computer program from a memory, so that a device installed with the chip performs the above data retransmission method.

Embodiments of the present application provide a computer-readable storage medium used for storing a computer program, the computer program causes a computer to perform the above data retransmission method.

Embodiments of the present application provide a computer program product comprising a computer program instruction, the computer program instruction causes a computer to perform the above data retransmission method.

Embodiments of the present application provide a computer program, when the computer program runs on a computer, causes the computer to perform the above data retransmission method.

Through the above technical solutions, broadcast and multicast of MBMS services are supported in an NR system. In addition, a mapping criterion of a correspondence between a PDCCH monitor occasion and an SSB is given when an MBMS service performs beam sweeping transmission. The PDCCH monitor occasion is used by a terminal device to detect and schedule a PDCCH of the MBMS service, thereby ensuring that the terminal device receives a scheduling information of the MBMS service at a correct position, and further correctly receives an MBMS service data.

BRIEF DESCRIPTION OF THE DRAWINGS

The accompanying drawings described herein are provided to provide a further understanding of the present application and constitute a part of the present application. The exemplary embodiments and descriptions of the present application are used to explain the present application, and do not constitute an improper limitation of the present application. In the accompanying drawings.

DETAILED DESCRIPTION OF ILLUSTRATED EMBODIMENTS

The technical solutions in the embodiments of the present application will be described below with reference to the accompanying drawings in the embodiments of the present application. Obviously, the described embodiments are some, but not all, embodiments of the present application. Based on the embodiments in the present application, all other embodiments obtained by those of ordinary skill in the art without creative efforts shall fall within a protection scope of the present application.

The technical solutions of embodiments of the present application may be applied to various communications systems, for example, a long term evolution (LTE) system, an LTE frequency division duplex (FDD) system, an LTE time division duplex (TDD) system, a 5th generation (5G) communication system or future communication system, etc.

Figure 1:
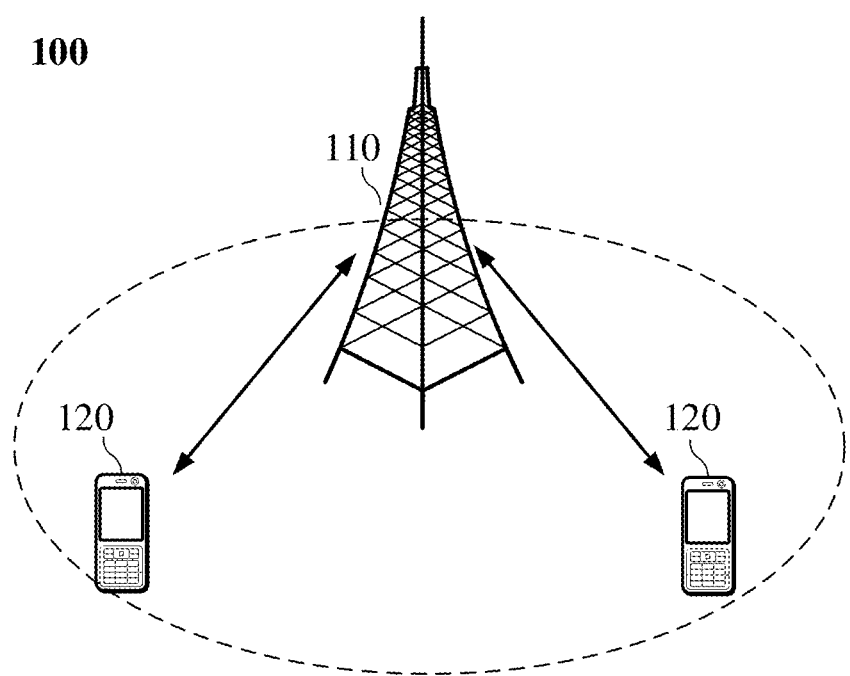
FIG. 1 is a schematic diagram of a communication system architecture provided by an embodiment of the present application.

Exemplarily, a communication system 100 to which embodiments of the present application are applied is as illustrated in FIG. 1. The communication system 100 may include a network device 110. The network device 110 may be a device communicating with a terminal 120 (or called a communication terminal or a terminal). The network device 110 can provide a communication coverage for a specific geographical area and communicate with terminal devices in the coverage area. The network device 110 may be an evolutional Node B (eNB or eNodeB) in the LTE system or may be a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future communication system.

The communication system 100 further includes at least one terminal device 120 located in the coverage area of the network device 110. The "terminal device" referred to herein can include but is not limited to a device configured to communicate via a wired line, another data connection/network, and/or a wireless interface, a device which is part of another terminal device and configured to receive/transmit communication signals, or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", and/or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browser, notebook, calendar, and/or global positioning system (GPS) receiver, and/or a conventional laptop, a handheld receiver, or other electronic devices equipped with a radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in a future evolved public land mobile network (PLMN), etc.

Optionally, terminal devices 120 can communicate with each other through device to device (D2D) communication.

Optionally, the 5G system or 5G network can also be referred to as an NR system or NR network.

FIG. 1 exemplarily illustrates one network device and two terminal devices. The communication system 100 may also include multiple network devices, and there can be other numbers of terminal devices in a coverage area of each of the network devices, and the embodiment of the present application is not limited in this regard.

Optionally, the communication system 100 may further include other network entities such as a network controller, a mobile management entity, or the like, and the embodiment of the present application is not limited in this regard.

It should be understood that, according to embodiments of the present, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the embodiment of the present application is not limited in this regard.

It should be understood that the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In order for better understanding of the technical solutions of embodiments of the present application, the following will describe in detail technical solutions related to the embodiments of the present application herein.

With people's pursuit of speed, low latency, high-speed mobility and energy efficiency, and diversity and complexity of services in future life, the 3rd generation partnership project (3GPP) international standard organization began developing 5G, and 5G is mainly applied to enhanced mobile broadband (eMBB), ultra-reliable low-latency communications (URLLC), and massive machine-type communications (mMTC).

On one hand, eMBB is still aimed at obtaining multimedia content, services, and data for users and grows rapidly in demand. On the other hand, because eMBB may be deployed in different scenarios, such as indoor, urban, rural areas, etc., its capabilities and requirements vary widely. Therefore, analysis of eMBB should depend on specific deployment scenarios. Typical applications of URLLC include industrial automation, power automation, telemedicine operations, and traffic safety assurance. mMTC is typically characterized by high connection density, small amount of data, delay-insensitive services, low cost of modules, and long service life.

In an early deployment of NR, complete NR coverage is difficult to obtain, and therefore typical network coverage modes are wide-area LTE coverage and island coverage of NR. In addition, a large amount of LTE is deployed below 6 GHz (gigahertz), with few spectrums below 6 GHz available for 5G Therefore, it is necessary to conduct research on applications of spectrum above 6 GHz in NR. However, high-frequency bands have limited coverage and are fast in signal fading. In addition, in order to protect early investment of mobile operators in LTE, a tight interworking mode between LTE and NR is proposed.

In order to achieve 5G network deployment and commercial applications as soon as possible, 3GPP first completed a first 5G version, namely E-UTRA-NR dual connectivity (EN-DC). In EN-DC, an LTE base station (eNB) serves as a master node (MN), and an NR base station (gNB or en-gNB) serves as a secondary node (SN). In the later stage of R15, other DC modes, that is, NR-E-UTRA (NE)-DC, 5G core network (5GC)-EN-DC, NR DC, will be supported. For the EN-DC, the core network connected to the access network is EPC, while for the other DC modes, the core network connected to the access network is 5GC.

The technical solutions of the embodiments of the present application provide an enhanced architecture of dual connectivity (DC). That is, a multiple connectivity (MC) architecture. Typically, the MC architecture may be an MR-MC architecture.

RRC State:

In order to reduce air interface signaling, restore wireless connection quickly, and restore data services quickly, a new radio resource control (RRC) state, i.e., RRC_INACTIVE state, is defined for 5G. This state is different from an RRC_IDLE state and an RRC_ACTIVE state.

1) In the RRC_IDLE state (referred to as an idle state for short): mobility is UE-based cell selection and reselection, paging is initiated by a core network (CN), and a paging area is configured by the CN. There is neither UE context nor RRC connection at the base station side.

2) In an RRC_CONNECTED state (referred to as a connected state for short): an RRC connection exists, and UE contexts exist at the base station side and the UE side. The network side knows that the position of the UE is at a specific cell level. Mobility is controlled by the network side. Unicast data may be transmitted between the UE and the base station.

3) In the RRC_INACTIVE state (referred to as an inactive state for short): mobility is UE-based cell selection and reselection, there is a connection between a CN and an NR, there is a UE context on a certain base station, paging is triggered by a radio access network (RAN), a RAN-based paging area is managed by the RAN, and the network side knows that the position of the UE is at a RAN-based paging area level.

Figure 2:
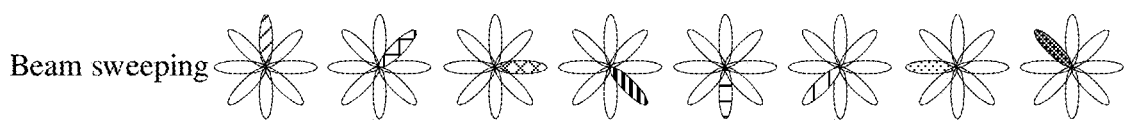
FIG. 2 is a schematic diagram of beam sweeping provided by an embodiment of the present application.
Figure 3:
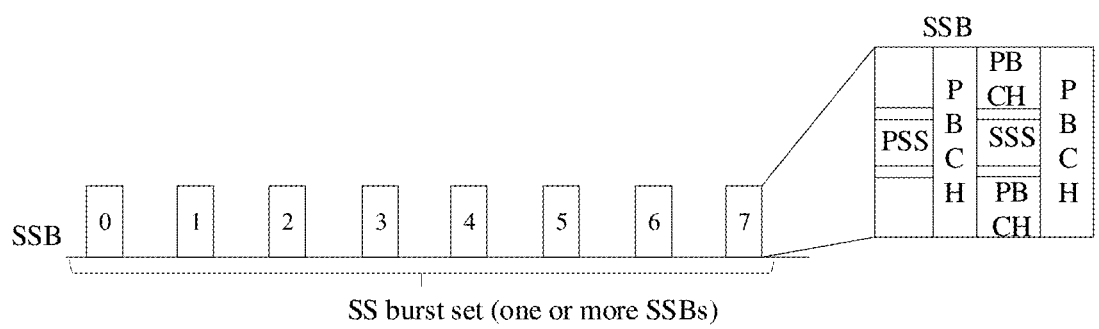
FIG. 3 is a schematic diagram of an SSB provided by an embodiment of the present application.
Figure 4:
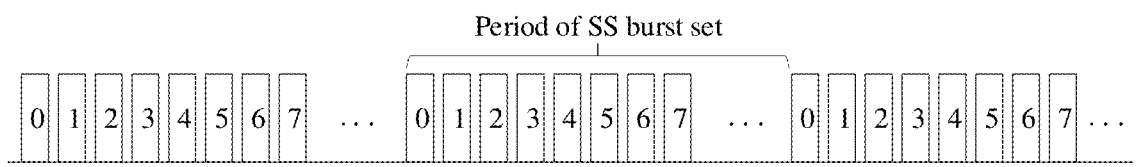
FIG. 4 is a schematic diagram of a period of an SSB burst set provided by an embodiment of the present application.

Beam Sweeping:

NR will be deployed on high frequencies in the future. In order to improve coverage, in 5G, a beam sweeping mechanism is introduced to meet coverage needs (space for coverage, time for space), as illustrated in FIG. 2. After the introduction of beam sweeping, a synchronization signal needs to be sent in each beam direction. Synchronization signals of 5G are given in the form of SSB, including a primary synchronization signal (PSS), a secondary synchronization signal (SSS), and a physical broadcast channel (PBCH), as illustrated in FIG. 3. The 5G synchronization signal appears periodically in time domain in the form of a synchronization signal burst set (SS burst set), as illustrated in FIG. 4.

MBMS:

MBMS is introduced in 3GPP release 6 (R6). MBMS is a technology that transmits data from one data source to multiple UEs by sharing network resources. This technology can effectively utilize network resources while providing multimedia services and realize broadcast and multicast of multimedia services at higher rates (e.g., 256 kbps).

Due to a low spectral efficiency of MBMS in 3GPP R6, it is not enough to effectively carry and support an operation of mobile TV type services. Therefore, in LTE, 3GPP clearly proposes to enhance a support capability for downlink high-speed MBMS services and determines design requirements for physical layer and air interface.

3GPP R9 introduced evolved MBMS (eMBMS) into LTE. eMBMS proposes a concept of single frequency network (SFN), namely multimedia broadcast multicast service single frequency network (MBSFN). MBSFN uses a uniform frequency to transmit service data in all cells at the same time, but the synchronization between cells should be guaranteed. In this way, an overall signal-to-noise ratio distribution of the cell can be greatly improved, and a spectral efficiency will also be greatly improved accordingly. eMBMS implements service broadcast and multicast based on IP multicast protocol.

In LTE or LTE-Advanced (LTE-A), MBMS has only a broadcast bearer mode and no multicast bearer mode. In addition, the reception of MBMS services is applicable to UEs in idle state or connected state.

In 3GPP R13, a concept of single cell point to multipoint (SC-PTM) is introduced, and the SC-PTM is based on the MBMS network architecture.

MBMS introduces new logical channels, including single cell-multicast control channel (SC-MCCH) and single cell-multicast transport channel (SC-MTCH). SC-MCCH and SC-MTCH are mapped to downlink-shared channel (DL-SCH). Further, the DL-SCH is mapped to a physical downlink shared channel (PDSCH). SC-MCCH and SC-MTCH belong to logical channels, DL-SCH belongs to transport channels, and PDSCH belongs to physical channels. SC-MCCH and SC-MTCH do not support a hybrid automatic repeat request (HARM) operation.

MBMS introduces a new system information block (SIB) type, namely SIB20. Specifically, a configuration information of the SC-MCCH is transmitted through SIB20, and a cell has only one SC-MCCH. The configuration information of the SC-MCCH includes a modification period of the SC-MCCH, a repetition period of the SC-MCCH, and information such as a radio frame and a subframe in which the SC-MCCH is scheduled. Further, 1) the boundary of the modification period of SC-MCCH satisfies SFN mod m=0, where SFN represents a system frame number of the boundary, and m is the modification period of SC-MCCH configured in SIB20 (i.e., sc-mcch-ModificationPeriod). 2) The radio frame for scheduling SC-MCCH satisfies: SFN mod mcch-RepetitionPeriod=mcch-Offset, where SFN represents the system frame number of the radio frame, mcch-RepetitionPeriod represents the repetition period of SC-MCCH, and mcch-Offset represents SC-MCCH offset. 3) The subframe in which the SC-MCCH is scheduled is indicated by sc-mcch-Subframe.

The SC-MCCH is scheduled through a physical downlink control channel (PDCCH). On the one hand, a new radio network temporary identity (RNTI), that is, a single cell RNTI (SC-RNTI) is introduced to identify the PDCCH (such as SC-MCCH PDCCH) used for scheduling the SC-MCCH. Optionally, a fixed value of SC-RNTI is FFFC. On the other hand, a new RNTI, i.e., single cell notification RNTI (SC-N-RNTI), is introduced to identify the PDCCH (e.g., notification PDCCH) used to indicate a change notification of the SC-MCCH. Optionally, a fixed value of SC-N-RNTI is FFFB. Further, the change notification may be indicated by one bit of 8 bits of DCI 1C. In LTE, the configuration information of the SC-PTM is based on the SC-MCCH configured by the SIB20, and then the SC-MCCH configures the SC-MTCH, and the SC-MTCH is used to transmit service data.

Specifically, the SC-MCCH only transmits one message (i.e., SCPTMConfiguration). This message is used to configure the configuration information of SC-PTM. The configuration information of SC-PTM includes a temporary mobile group identity (TMGI), a session identifier (session ID), a group RNTI (G-RNTI), a discontinuous reception (DRX) configuration information, and SC-PTM service information of neighboring cells, etc. It should be noted that the SC-PTM in R13 does not support a robust header compression (ROHC) function.

Downlink discontinuous reception of SC-PTM is controlled by the following parameters: onDurationTimerSCPTM, drx-InactivityTimerSCPTM, SC-MTCH-SchedulingCycle, and SC-MTCH-SchedulingOffset.

When [(SFN*10)+subframe number] modulo (SC-MTCH-SchedulingCycle)=SC-MTCH-SchedulingOffset is satisfied, a timer onDurationTimerSCPTM is started.

When a downlink PDCCH scheduling is received, a timer drx-InactivityTimerSCPTM is started.

The downlink SC-PTM service is received only when the timer onDurationTimerSCPTM or drx-InactivityTimerSCPTM is running.

SC-PTM business continuity adopts a concept of MBMS business continuity based on SIB15, namely "SIB15+MBMSInterestIndication". A service continuity of a UE in in idle state is based on a concept of frequency priority.

In NR, many scenarios need to support business requirements of multicast and broadcast, such as internet of vehicles, industrial internet, etc. Therefore, it is necessary to introduce MBMS in NR. NR MBMS is transmitted by beam sweeping on the air interface. First, in order to improve a transmission reliability, a repeated transmission mechanism can be introduced. Secondly, a transmission of broadcast service data in beam sweeping mode requires an association between a scheduling signaling (i.e., PDCCH) of the MBMS service and the SSB. This facilitates the UE to correctly acquire MBMS service data. To this end, the following technical solutions of the embodiments of the present application are proposed.

Figure 5:
FIG. 5 is a schematic diagram of a first SIB related configuration provided by an embodiment of the present application.

In the technical solutions of the embodiments of the present application, a new SIB (called a first SIB) is defined. Referring to FIG. 5, the first SIB includes a configuration information of a first MCCH. Here, the first MCCH is a control channel of an MBMS service. In other words, the first SIB is used to configure a configuration information of a control channel of an NR MBMS. Optionally, the control channel of the NR MBMS may also be called an NR MCCH (i.e., a first MCCH).

Further, the first MCCH is used to carry a first signaling. This embodiment of the present application does not limit the name of the first signaling. For example, the first signaling is signaling A. The first signaling includes configuration information of at least one first MTCH. Here, the first MTCH is a traffic channel (also referred to as a data channel or a transport channel) of the MBMS service. The first MTCH is used to transmit MBMS service data (such as NR MBMS service data). In other words, the first MCCH is used to configure the configuration information of the traffic channel of the NR MBMS. Optionally, the traffic channel of the NR MBMS may also be called an NR MTCH (i.e., the first MTCH).

In details, the first signaling is used to configure the traffic channel of the NR MBMS, a service information corresponding to a service channel, and a scheduling information corresponding to the service channel. Further, optionally, the service information corresponding to the service channel, such as TMGI, session ID, and other service identification information. The scheduling information corresponding to the traffic channel, for example, an RNTI used when the MBMS service data corresponding to the traffic channel is scheduled, such as G-RNTI, DRX configuration information, and the like.

It should be noted that transmissions of the first MCCH and the first MTCH are both scheduled based on the PDCCH. The RNTI used by the PDCCH for scheduling the first MCCH uses a unique identifier of the entire network, that is, a fixed value. The RNTI used by the PDCCH for scheduling the first MTCH is configured through the first MCCH.

Figure 6:
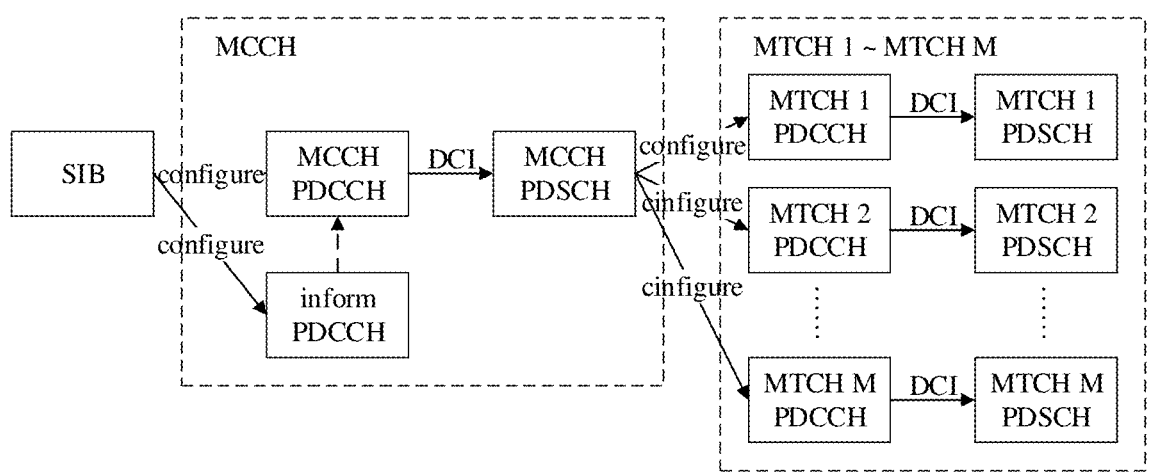
FIG. 6 is a schematic diagram of a PTM configuration transmission mechanism provided by an embodiment of the present application.
Figure 7:
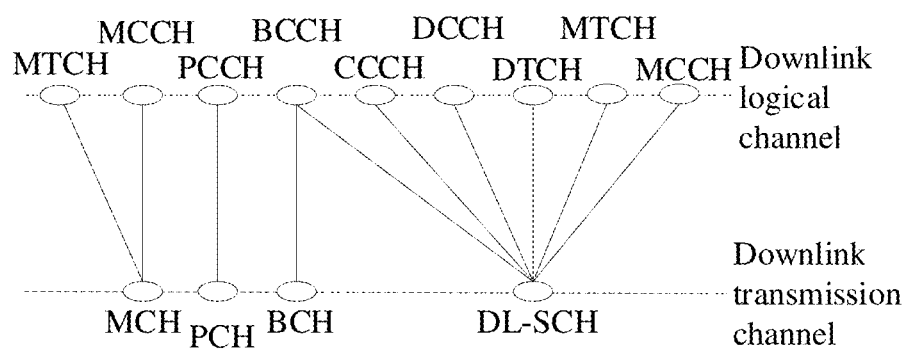
FIG. 7 is a PTM channel and a mapping diagram thereof provided by an embodiment of the present application.

It should be noted that, this embodiment of the present application does not limit the naming of the first SIB, the first MCCH, and the first MTCH. For convenience of description, the first SIB may also be abbreviated as SIB, the first MCCH may also be abbreviated as MCCH, and the first MTCH may also be abbreviated as MTCH. Referring to FIG. 6, the PDCCH (i.e., the MCCH PDCCH) used for scheduling the MCCH and the notification PDCCH are configured through the SIB. The PDSCH (i.e., MCCH PDSCH) used to transmit the MCCH is scheduled through a DCI carried by the MCCH PDCCH. Further, M PDCCHs for scheduling the MTCH (i.e., MTCH 1 PDCCH, MTCH 2 PDCCH, . . . , MTCH M PDCCH) are configured through the MCCH. The DCI scheduling carried by the MTCH n PDCCH is used to transmit the PDSCH of the MTCH n (i.e., the MTCH n PDSCH), where n is an integer greater than or equal to 1 and less than or equal to M. Referring to FIG. 7, MCCH and MTCH are mapped on DL-SCH. Further, the DL-SCH is mapped to the PDSCH. MCCH and MTCH belong to logical channels, DL-SCH belongs to transport channels, and PDSCH belongs to physical channels.

Figure 8:
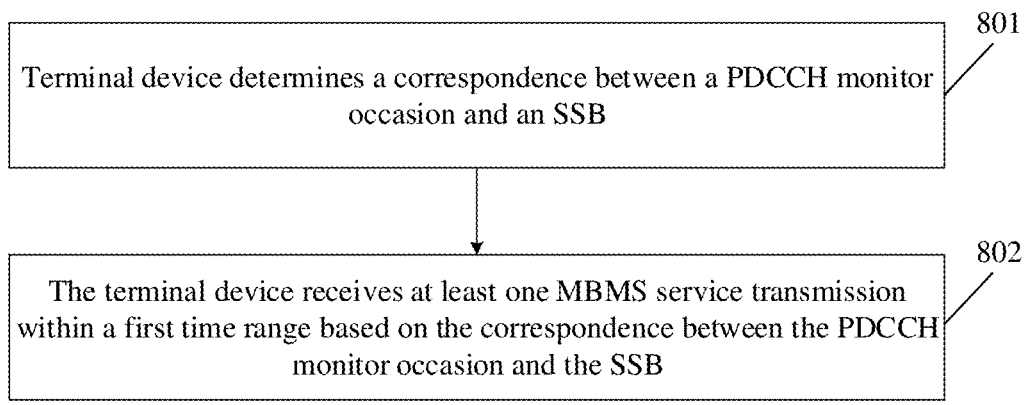
FIG. 8 is a schematic flowchart of a data retransmission method provided by an embodiment of the present application.

FIG. 8 is a schematic flowchart of a data retransmission method provided by an embodiment of the present application. As illustrated in FIG. 8, the data retransmission method includes the following steps.

Step 801: The terminal device determines a correspondence between a PDCCH monitor occasion and an SSB.

In an embodiment of the present application, the PDCCH monitor occasion is used to transmit the PDCCH. The PDCCH is used to schedule MBMS service transmission, or the PDCCH is used to carry scheduling information of MBMS service transmission.

In an embodiment of the present application, the transmission of the MBMS service is transmitted in a beam sweep manner. In order to ensure that the terminal device correctly receives the MBMS service transmission, it needs to correctly receive the PDCCH that schedules the MBMS service transmission. Therefore, it is necessary to determine the correspondence between the PDCCH monitor occasion and the SSB.

In an embodiment of the present application, the terminal device may use any one of the following manners to determine the correspondence between the PDCCH monitor occasion and the SSB:

Manner 1:

For an m*S+nth PDCCH monitor occasion within the first time range, there is a correspondence between the m*S+nth PDCCH monitor occasion and an nth SSB; wherein m, S, and n are all integers, $0 \leq m \leq X-1$, S is a number of SSBs actually transmitted, $1 \leq n \leq S$, X is a number of MBMS service transmissions within the first time range.

In an alternative embodiment, X is an integer greater than one. X indicates that the MBMS service is repeatedly transmitted X times. That is, X copies can be transmitted for the transmission of the MBMS service. m and n are positive integers, and their values can be m=0, 1, 2 ... X−1, n=1, 2, 3 ... S.

Figure 9:
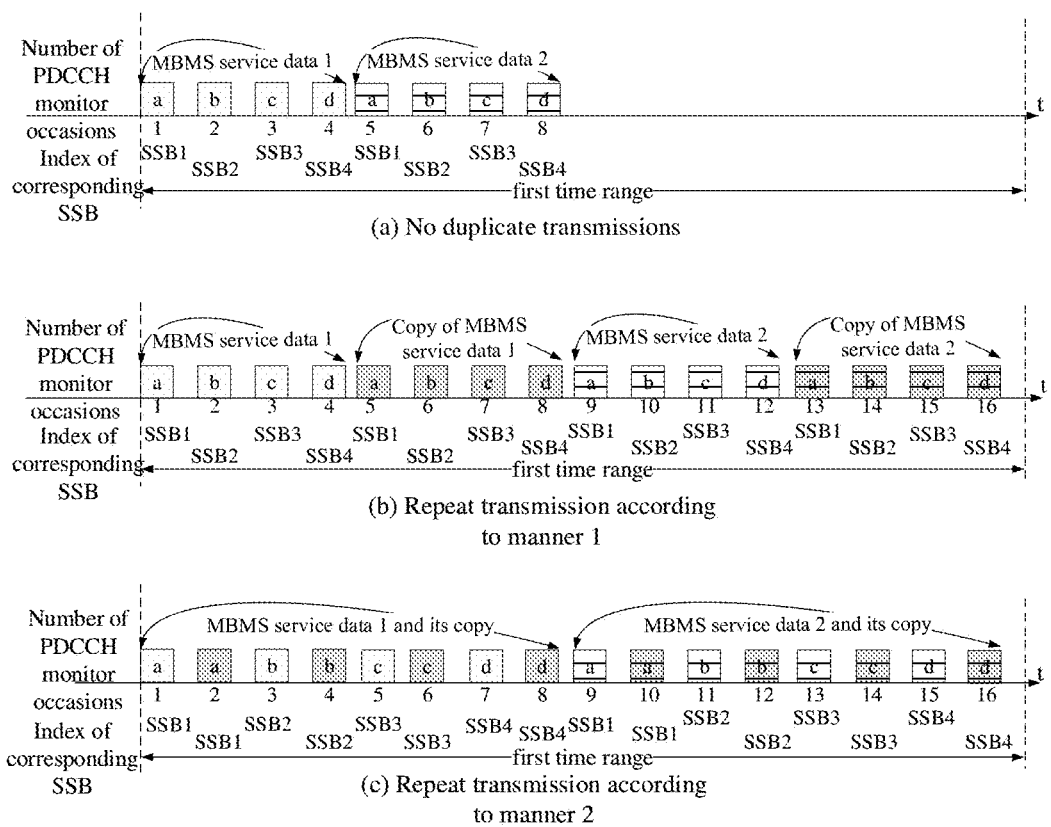
FIG. 9 is a diagram of a correspondence between a PDCCH monitor occasion and an SSB provided by an embodiment of the present application.

Referring to FIG. 9, the case of no repeated transmission is illustrated in (a), and the transmission times of MBMS service data 1 and MBMS service 2 are both 1 time. Given in (b) is the case of repeated transmissions according to manner 1. X=2, the transmission times of MBMS service data 1 and MBMS service 2 are both 2 times. Taking n=2, S=4, and m=0 as an example, there is a correspondence between a second PDCCH monitor occasion and a second SSB (i.e., SSB2). Taking n=2, S=4, and m=1 as an example, there is a correspondence between a sixth PDCCH monitor occasion and the second SSB (i.e., SSB2). Taking n=3, S=4, m=1 as an example, there is a correspondence between a seventh PDCCH monitor occasion and a third SSB (i.e., SSB3).

Manner 2:

For n*X+mth to (n+1)*Xth PDCCH monitor occasions within the first time range, there is a correspondence between the n*X+mth to (n+1)*Xth PDCCH monitor occasions and an n+1th SSB; wherein n, X, and m are all integers, $0 \leq n \leq S-1$, S is a number of SSBs actually transmitted, $1 \leq m \leq X$, X is a number of MBMS service transmissions within the first time range. Further, the n*X+mth to (n+1)*Xth PDCCH monitor occasions respectively correspond to 1st to Xth MBMS service transmissions associated with the n+1th SSB.

In an alternative embodiment, X is an integer greater than one. X indicates that the MBMS service is repeatedly transmitted X times. That is, X copies can be transmitted for the transmission of the MBMS service. n and m are positive integers, and their values can be n=0, 1, 2, 3 ... S−1, m=1, 2, 3 ... X.

Referring to FIG. 9, the case of no repeated transmission is illustrated in (a), and the transmission times of MBMS service data 1 and MBMS service 2 are both 1 time. Given in (c) is the case of repeated transmission according to manner 2. X=2, the transmission times of MBMS service data 1 and MBMS service 2 are both 2 times. Taking n=3, S=4, and m=1 as an example, there is a correspondence between a seventh PDCCH monitor occasion to an eighth PDCCH monitor occasion and a fourth SSB (i.e., SSB4). Taking n=0, S=4, and m=2 as an example, there is a correspondence between a second PDCCH monitor occasion and the first SSB (i.e., SSB1).

Step 802: The terminal device receives at least one MBMS service transmission within a first time range based on the correspondence between the PDCCH monitor occasion and the SSB.

In an embodiment of the present application, the premise of determining the correspondence between the PDCCH monitor occasion and the SSB is to determine the first time range (or called a window) for the number of the PDCCH monitor occasion, and further determine the number of the PDCCH monitor occasion within the first time range. The number of the PDCCH monitor occasion within the first time range may be determined in any of the following manners:

Manner 1:

The first time range includes K radio frames, where K is an integer, and $K \geq 1$. The number of starting radio frames of K radio frames satisfies SFN mod K=0, where SFN represents the number of the starting radio frames. The PDCCH monitor occasions in the K radio frames are numbered in ascending order. Here, mod stands for a remainder operation.

Optionally, the value of K is predetermined through a protocol or configured through a network.

In details, after the number of the starting radio frame is determined by SFN mod K=0, the PDCCH monitor occasions in the K radio frames are numbered from 1 from the starting radio frame. Here, the PDCCH monitor occasion refers to the PDCCH monitor occasion corresponding to the MBMS service.

Manner 2:

The first time range is a time range corresponding to the first time window. The PDCCH monitor occasions in the first time window are numbered in ascending order.

Optionally, the configuration information of the first time window is agreed through a protocol or configured through a network. Further, the configuration information of the first time window includes at least one of the followings:

a first information, whereon the first information is used to determine a time length of the first time window;

a second information, wherein the second information is used to determine a starting position of the first time window.

Here, the second information is a first offset, and the first offset is used to determine the starting position of the first time window.

In the above solution, the starting position of the first time window is determined by at least one of the followings: a starting radio frame, a starting subframe, a starting slot, and a starting symbol.

In details, a first time window is defined. The network may configure configuration information of the first time window such as the time length of the first time window and the configuration information for determining the starting position of the first time window. The configuration information for determining the starting position of the first time window may be a first offset. For example, the starting position of the first time window is determined by SFN mod T=offset. SFN represents the SFN number where the starting position of the first time window is located, T represents the time length of the first time window, and offset represents the first offset. Here, a granularity of the starting position of the first time window is taken as an example of a granularity of SFN. However, it is not limited to the granularity of SFN, and a granularity of subframes, a granularity of slots, or a granularity of symbols may also be used as the granularity. Here is an example with a granularity of subframes:

SFN mod $T$=FLOOR(SubframeOffset/10)

subframe=SubframeOffset mod 10

SFN represents the SFN number where the starting position of the first time window is located. subframe represents the subframe number where the starting position of the first time window is located. T represents the time length of the first time window. SubframeOffset represents the first offset. FLOOR stands for round down operation, and FLOOR stands for remainder operation. The SFN number and the subframe number determined by the above two formulas determine the starting position of the first time window. The PDCCH monitor occasions are numbered from 1 in the first time window until the end of the first time window.

Manner 3:

The first time range is a DRX activation time of a DRX period. The PDCCH monitor occasions within the DRX activation time are numbered in ascending order. Alternatively, the first time range is a DRX period, and the DRX period includes a DRX activation time and a DRX inactivation time. The PDCCH monitor occasions in the DRX period are numbered in ascending order.

In details, the DRX activation time is also called DRX on duration. The PDCCH monitor occasions may be numbered from 1 starting at the start of the DRX on duration until the terminal device enters the DRX inactive time or until a starting boundary of the next DRX on duration.

Manner 4:

The first time range is an MBMS period, and the MBMS period is used to transmit MBMS services or to configure MBMS resource positions; the PDCCH monitor occasions in the MBMS period are numbered in ascending order.

Optionally, the configuration information of the MBMS period is agreed through a protocol or configured through a network. Further, the configuration information of the MBMS period includes at least one of the followings:

A third information, wherein the third information is used to determine a time length of the MBMS period;

A fourth information, wherein the fourth information is used to determine a starting position of the MBMS period.

In details, the MBMS period is defined. The MBMS period is used to configure MBMS resource positions. Taking the position of subframes for configuring MBMS service transmission as an example, in time domain, which subframes are used for MBMS service transmission, which subframes are not used for MBMS service transmission, and the period (i.e., the time length of the MBMS period) and/or offset information of the MBMS subframe configuration mode can be configured. In one example, the SFN number at which a starting boundary of the MBMS period is located satisfies SFN mod T=offset, where T represents the time length of the MBMS period, and offset represents the offset information. From the starting boundary of the MBMS period, the PDCCH monitor occasions in the MBMS period are numbered from 1 until the end of the MBMS period.

Manner 5:

The first time range is a time range corresponding to a second time window; the PDCCH monitor occasions in the second time window are numbered in ascending order.

Here, a new time window is defined, which is called a second time window, and the PDCCH monitor occasions in the second time window are numbered from 1 to the end of the second time window from the starting boundary of the second time window.

It should be noted that this embodiment of the present application does not limit the name of the second time window, for example, it may be time window A. The definition of the second time window is described below.

1) The second time window is used to transmit a new transmission of multiple data and at least one retransmission corresponding to each of the multiple data.

For example, the second time window includes three new data transmissions and one retransmission corresponding to each data, totaling six data transmissions.

2) The second time window is used to transmit a new transmission of data and at least one retransmission corresponding to the data.

For example, the second time window includes a new transmission of one data and one retransmission corresponding to the data, for a total of two data transmissions.

3) The second time window is used to transmit a new transmission of data or a retransmission of the data. A new transmission of data and at least one retransmission corresponding to the data are transmitted through multiple second time windows, and the second time windows are included in the third time window.

For example, the second time window includes one new transmission of data or one retransmission corresponding to one data. If a new transmission of one data and one retransmission corresponding to the data need to be transmitted, two second time windows are required. Further, a third time window may be redefined, the third window includes multiple second time windows, and the second time windows correspond to a new transmission of data and at least one retransmission corresponding to the data.

It should be noted that the new transmission involved in the embodiments of the present application refers to the first transmission of data, and the retransmission refers to the second transmission of data, the third transmission, and the like.

In an optional embodiment of the present application, when the above five manners are used to number the PDCCH monitor occasions, there are the following two processing manners:

(A) PDCCH monitor occasions on all subframes within the first time range are consecutively numbered.

In details, the PDCCH monitor occasion is within the first time range, and continuous numbering of the PDCCH monitor occasion is performed regardless of whether it is an MBMS subframe or a non-MBMS subframe.

(B) The PDCCH monitor occasions on the MBMS subframes within the first time range are consecutively numbered.

In details, when the PDCCH monitor occasions are within the first time range, only the PDCCH monitor occasions on the MBMS subframe are continuously numbered.

It should be noted that the first time range includes MBMS subframes and/or non-MBMS subframes. The MBMS subframe refers to a subframe for transmitting MBMS services, and the non-MBMS subframe refers to a subframe for transmitting non-MBMS services.

It should be noted that the PDCCH monitor occasion involved in the embodiments of the present application refers to the PDCCH monitor occasion corresponding to the MBMS service, and the PDCCH monitor occasion may also be referred to as the MBMS PDCCH monitor occasion.

In an optional implementation manner of the present application, the terminal device receives configuration information of a first PDCCH resource, where the first PDCCH resource is used to transmit an MBMS service. The period of the first PDCCH resource has an integer multiple relationship with a DRX period, and a starting position of a DRX activation time of the DRX period is aligned with a starting position of the period of the first PDCCH resource.

Here, for the scheme of numbering the PDCCH monitor occasions in the above five manners, when a network configures the MBMS PDCCH resource (i.e., the first PDCCH resource), its period and the DRX period have an integral multiple relationship. That is, the DRX period is an integer multiple of the MBMS PDCCH resource period. The network configuration ensures that the starting boundary of the DRX on duration (that is, the DRX activation time) in the DRX period is aligned with the starting boundary of the MBMS PDCCH resource period.

Figure 10:
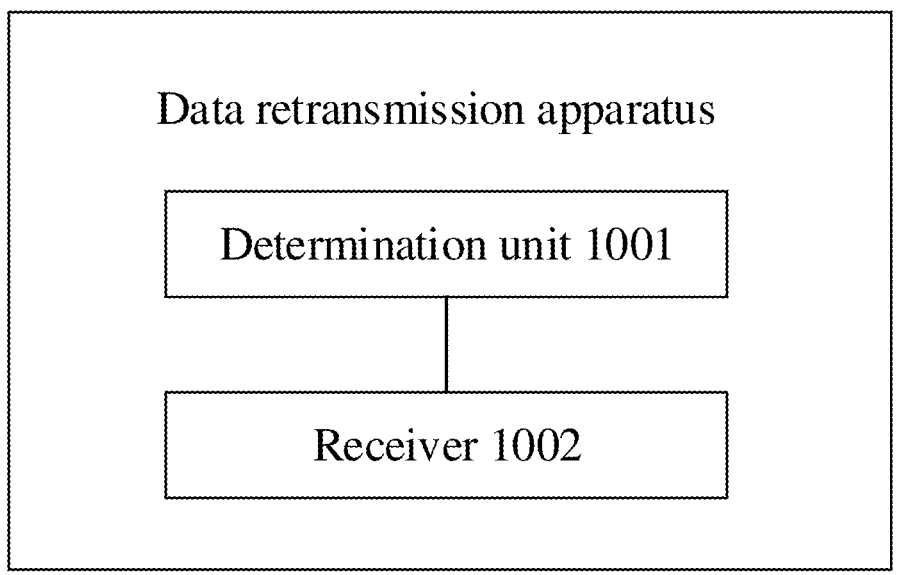
FIG. 10 is a schematic structural composition diagram of a data retransmission apparatus provided by an embodiment of the present application.

FIG. 10 is a schematic structural diagram of a data retransmission apparatus provided by an embodiment of the present application. As illustrated in FIG. 10, the data retransmission apparatus includes:

a determination unit 1001 configured to determine a correspondence between a PDCCH monitor occasion and an SSB;

a receiver 1002 configured to receive at least one MBMS service transmission within a first time range based on the correspondence between the PDCCH monitor occasion and the SSB.

In an alternative embodiment, the determination unit 1001 is configured to determine the correspondence between the PDCCH monitor occasion and the SSB as follows:

for an m*S+nth PDCCH monitor occasion within the first time range, there is a correspondence between the m*S+nth PDCCH monitor occasion and an nth SSB;

wherein m, S, and n are all integers, 0≤m≤X−1, S is a number of SSBs actually transmitted, 1≤n≤S, X is a number of MBMS service transmissions within the first time range.

In an alternative embodiment, the determination unit 1001 is configured to determine the correspondence between the PDCCH monitor occasion and the SSB as follows:

for n*X+mth to (n+1)*Xth PDCCH monitor occasions within the first time range, there is a correspondence between the n*X+mth to (n+1)*Xth PDCCH monitor occasions and an n+1th SSB;

wherein n, X, and m are all integers, 0≤n≤S−1, S is a number of SSBs actually transmitted, 1≤m≤X, X is a number of MBMS service transmissions within the first time range.

In an alternative embodiment, the n*X+mth to (n+1)*Xth PDCCH monitor occasions respectively correspond to 1st to Xth MBMS service transmissions associated with the n+1th SSB.

In an alternative embodiment, the determination unit 1001 is configured to determine a number of the PDCCH monitor occasion within the first time range.

In an alternative embodiment, the first time range comprises K radio frames, where K is an integer, and K≥1; numbers of starting radio frames of the K radio frames satisfy SFN mod K=0, where SFN represents the numbers of the starting radio frames;

the PDCCH monitor occasions in the K radio frames are numbered in ascending order.

In an alternative embodiment, a value of the K is predetermined through a protocol or configured through a network.

In an alternative embodiment, the first time range is a time range corresponding to a first time window;

PDCCH monitor occasions within the first time window are numbered in ascending order.

In an alternative embodiment, a configuration information of the first time window is agreed through a protocol or configured through a network.

In an alternative embodiment, the configuration information of the first time window comprises at least one of the followings:

a first information, wherein the first information is used to determine a time length of the first time window;

a second information, wherein the second information is used to determine a starting position of the first time window.

In an alternative embodiment, the second information is a first offset, and the first offset is used to determine the starting position of the first time window.

In an alternative embodiment, the starting position of the first time window is determined by at least one of the followings: a starting radio frame, a starting subframe, a starting slot, and a starting symbol.

In an alternative embodiment, the first time range is a DRX activation time of a DRX period; PDCCH monitor occasions in the DRX activation time are numbered in ascending order; or the first time range is the DRX period, and the DRX period comprises a DRX activation time and a DRX inactivation time; PDCCH monitor occasions in the DRX period are numbered in ascending order.

In an alternative embodiment, the first time range is an MBMS period, and the MBMS period is used to transmit MBMS services or to configure MBMS resource positions; PDCCH monitor occasions in the MBMS period are numbered in ascending order.

In an alternative embodiment, a configuration information of the MBMS period is agreed through a protocol or configured through a network.

In an alternative embodiment, the configuration information of the MBMS period comprises at least one of the followings:

a third information, wherein the third information is used to determine a time length of the MBMS period;

a fourth information, wherein the fourth information is used to determine a starting position of the MBMS period.

In an alternative embodiment, the first time range is the time range corresponding to the second time window;

PDCCH monitor occasions in the second time window are numbered in ascending order.

In an alternative embodiment, the second time window is used to transmit a new transmission of multiple data and at least one retransmission corresponding to each of the multiple data.

In an alternative embodiment, the second time window is used to transmit a new transmission of data and at least one retransmission corresponding to the data.

In an alternative embodiment, the second time window is used to transmit a new transmission of data or a retransmission of the data.

In an alternative embodiment, the new transmission of data and at least one retransmission corresponding to the data are transmitted through multiple second time windows, and the multiple second time windows are included in a third time window.

In an alternative embodiment, the first time range comprises MBMS subframes and/or non-MBMS subframes, the MBMS subframes refer to subframes used to transmit MBMS services, and the non-MBMS subframes refer to subframes used to transmit non-MBMS services;

PDCCH monitor occasions on all subframes within the first time range are consecutively numbered; or PDCCH monitor occasions on the MBMS subframes within the first time range are consecutively numbered.

In an alternative embodiment, the receiver 1002 is further configured to receive a configuration information of a first PDCCH resource, the first PDCCH resource is used to transmit an MBMS service; wherein a period of the first PDCCH resource and a DRX period have an integer multiple relationship, and a starting position of a DRX activation time of the DRX period is aligned with a starting position of the period of the first PDCCH resource.

Those skilled in the art should understand that the relevant description of the above-mentioned data retransmission apparatus in the embodiment of the present application can be understood with reference to the relevant description of the data retransmission method in the embodiment of the present application.

Figure 11:
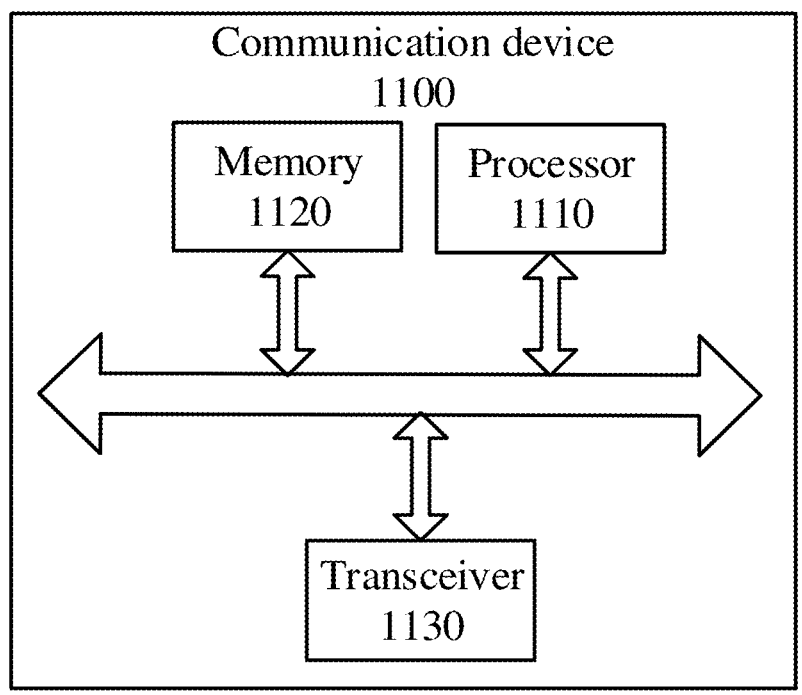
FIG. 11 is a schematic structural diagram of a communication device provided by an embodiment of the present application.

FIG. 11 is a schematic structural diagram of a communication device 1100 provided by an embodiment of the present application. The communication device may be a terminal device or a network device. The communication device 1100 illustrated in FIG. 11 includes a processor 1110, and the processor 1110 may call and run a computer program in a memory to implement the method in the embodiments of the present application.

Optionally, as illustrated in FIG. 11, the communication device 1100 may further include the memory 1120. The processor 1110 may call and run the computer program in the memory 1120 to implement the method in the embodiments of the present application.

The memory 1120 may be an independent device independent of the processor 1110 and may also be integrated into the processor 1110.

Optionally, as illustrated in FIG. 11, the communication device 1100 may further include a transceiver 1130, and the processor 1110 may control the transceiver 1130 to communicate with another device, specifically sending information or data to the other device or receiving information or data from the other device.

The transceiver 1130 may include a transmitter and a receiver. The transceiver 1130 may further include antennae. The number of the antennae may be one or more.

Optionally, the communication device 1100 may specifically be the network device of the embodiments of the present application. The communication device 1100 may implement corresponding flows implemented by the network device in each method of the embodiments of the present application. For simplicity, elaborations are omitted herein.

Optionally, the communication device 1100 may specifically be the mobile terminal/terminal device of the embodiments of the present application. The communication device 1100 may implement the corresponding flows implemented by the mobile terminal/terminal device in each method of the embodiments of the present application. For simplicity, elaborations are omitted herein.

Figure 12:
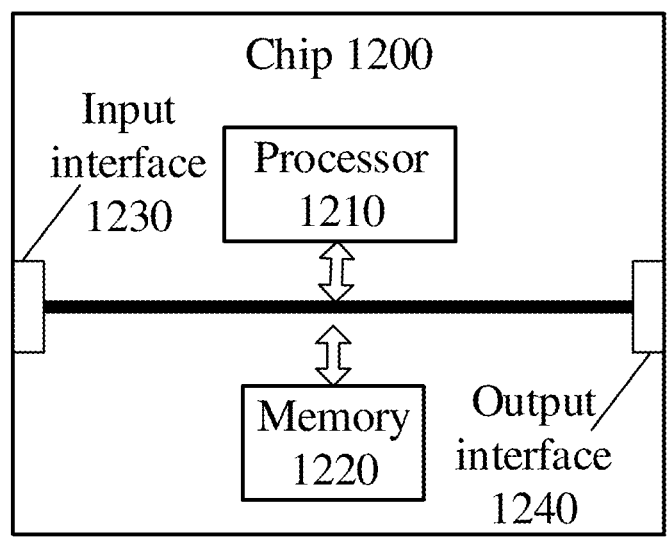
FIG. 12 is a schematic structural diagram of a chip according to an embodiment of the present application.

FIG. 12 is a schematic structural diagram of a chip provided by an embodiment of the present application. The chip 1200 illustrated in FIG. 12 includes a processor 1210. The processor 1210 may call and run a computer program in a memory to implement the method in the embodiments of the present application.

Optionally, as illustrated in FIG. 12, the chip 1200 may further include the memory 1220. The processor 1210 may call and run the computer program in the memory 1220 to implement the method in the embodiments of the present application.

The memory 1220 may be an independent device independent of the processor 1210 and may also be integrated into the processor 1210.

Optionally, the chip 1200 may further include an input interface 1230. The processor 1210 may control the input interface 1230 to communicate with another device or chip, specifically acquiring information or data from the another device or chip.

Optionally, the chip 1200 may further include an output interface 1240. The processor 1210 may control the output interface 1240 to communicate with another device or chip, specifically outputting information or data sent by the another device or chip.

Optionally, the chip may be applied to the network device of the embodiments of the present application. The chip may implement corresponding flows implemented by the network device in each method of the embodiments of the present application. For simplicity, elaborations are omitted herein.

Optionally, the chip may be applied to the mobile terminal/terminal device of the embodiment of the present application. The chip may implement corresponding flows implemented by the mobile terminal/terminal device in each method of the embodiment of the present application. For simplicity, elaborations are omitted herein.

It is to be understood that the chip mentioned in the embodiment of the present application may also be called a system-level chip, a system chip, a chip system, or a system on chip, etc.

Figure 13:
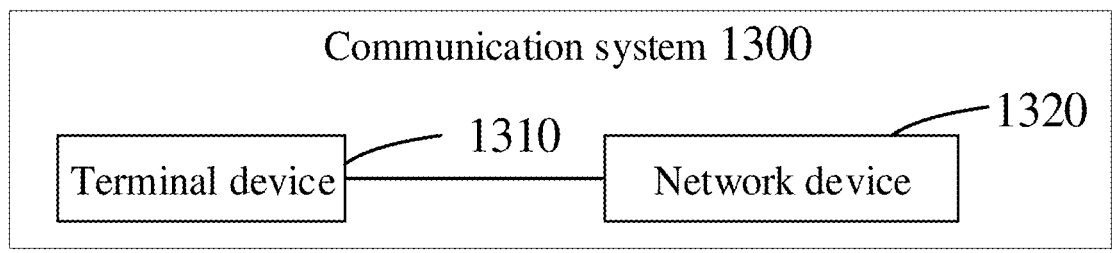
FIG. 13 is a schematic block diagram of a communication system provided by an embodiment of the present application.

FIG. 13 is a schematic block diagram of a communication system 1300 provided by an embodiment of the present application. As illustrated in FIG. 13, a communication system 1300 includes a terminal device 1310 and a network device 1320.

The terminal device 1310 may be configured to realize corresponding functions realized by the terminal device in the method. The network device 1320 may be configured to realize corresponding functions realized by the network device in the method. For simplicity, elaborations are omitted herein.

It is to be understood that the processor in the embodiment of the present application may be an integrated circuit chip and has a signal processing capacity. In an implementation process, each step of the method embodiments may be completed by an integrated logical circuit of hardware in the processor or an instruction in a software form. The processor may be a universal processor, a digital signal processor (DSP), an application specific integrated circuit (ASIC), a field programmable gate array (FPGA) or another programmable logical device, discrete gate or transistor logical device and discrete hardware component. Each method, step and logical block diagram disclosed in the embodiments of the present application may be implemented or executed. The universal processor may be a microprocessor, or the processor may also be any conventional processor and the like. The steps of the method disclosed in combination with the embodiments of the present application may be directly embodied to be executed and completed by a hardware decoding processor or executed and completed by a combination of hardware and software modules in the decoding processor. The software module may be located in a mature storage medium in this field such as a random access memory (RAM), a flash memory, a read-only memory (ROM), a programmable ROM (PROM) or electrically erasable PROM (EEPROM) and a register. The storage medium is located in a memory, and the processor reads information in the memory, and completes the steps of the method in combination with hardware.

It can be understood that the memory in the embodiment of the present application may be a volatile memory or a nonvolatile memory or may include both the volatile and nonvolatile memories. The nonvolatile memory may be a ROM, a PROM, an erasable PROM (EPROM), an EEPROM or a flash memory. The volatile memory may be a RAM and is used as an external high-speed cache. It is exemplarily but unlimitedly describing that RAMs in various forms may be adopted, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct rambus RAM (DR RAM). It is to be noted that the memory of a system and method described in the present application is intended to include, but not limited to, memories of these and any other proper types.

It is to be understood that the memory is exemplarily but unlimitedly described. For example, the memory in the embodiments of the present application may also be an SRAM, a DRAM, an SDRAM, a DDR SDRAM, an ESDRAM, an SLDRAM and a DR RAM. That is, the memory in the embodiments of the present application is intended to include, but not limited to, memories of these and any other proper types.

The embodiments of the present application also provide a computer-readable storage medium, which is configured to store a computer program.

Optionally, the computer-readable storage medium may be applied to a network device in the embodiments of the present application. The computer program causes a computer to execute corresponding flows implemented by the network device in each method of the embodiments of the present application. For simplicity, elaborations are omitted herein.

Optionally, the computer-readable storage medium may be applied to a mobile terminal/terminal device in the embodiments of the present application. The computer program causes a computer to execute corresponding flows implemented by the mobile terminal/terminal device in each method of the embodiments of the present application. For simplicity, elaborations are omitted herein.

The embodiments of the present application also provide a computer program product, which includes a computer program instruction.

Optionally, the computer program product may be applied to a network device in the embodiments of the present application. The computer program instruction causes a computer to execute corresponding flows implemented by the network device in each method of the embodiments of the present application. For simplicity, elaborations are omitted herein.

Optionally, the computer program product may be applied to a mobile terminal/terminal device in the embodiments of the present application. The computer program instruction causes the computer to execute corresponding flows implemented by the mobile terminal/terminal device in each method of the embodiments of the present application. For simplicity, elaborations are omitted herein.

The embodiments of the present application also provide a computer program.

Optionally, the computer program may be applied to a network device in the embodiments of the present application. The computer program runs in a computer to cause the computer to execute corresponding flows implemented by the network device in each method of the embodiments of the present application. For simplicity, elaborations are omitted herein.

Optionally, the computer program may be applied to a mobile terminal/terminal device in the embodiments of the present application. The computer program runs in the computer to cause the computer to execute corresponding flows implemented by the mobile terminal/terminal device in each method of the embodiments of the present application. For simplicity, elaborations are omitted herein.

Those of ordinary skill in the art may realize that the units and algorithm steps of each example described in combination with the embodiments disclosed in the present application may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present application.

Those skilled in the art may clearly learn about that specific working processes of the system, device and unit described above may refer to the corresponding processes in the method embodiment and will not be elaborated herein for convenient and brief description.

In some embodiments provided by the present application, it is to be understood that the disclosed system, device, and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated. Parts displayed as units may or may not be physical units, and namely may be located in the same place, or may also be distributed to multiple network units. Part or all of the units may be selected to achieve the solutions of the embodiments according to a practical requirement.

In addition, each functional unit in each embodiment of the present application may be integrated into a processing unit. Each unit may also physically exist independently. Two or more than two units may also be integrated into a unit.

When being realized in form of software functional unit and sold or used as an independent product, the function may also be stored in a computer-readable storage medium. For such an understanding, the technical solutions of the present application substantially or parts making contributions to the conventional art or part of the technical solutions may be embodied in form of software product. The computer software product may be stored in a storage medium, including a plurality of instructions configured to cause a computer device (which may be a personal computer, a server, a network device, or the like) to execute all or part of the steps of the method in each embodiment of the present application. The abovementioned storage medium includes various media capable of storing program codes such as a U disk, a mobile hard disk, a ROM, a RAM, a magnetic disk or an optical disk.

The above is only the specific implementation mode of the present application and not intended to limit the scope of protection of the present application. Any variations or replacements apparent to those skilled in the art within the technical scope disclosed by the present application shall fall within the scope of protection of the present application. Therefore, the scope of protection of the present application shall be subject to the scope of protection of the claims.

What is claimed is:

1. A data retransmission method, comprising:
a terminal device determining a correspondence between a physical downlink control channel (PDCCH) monitor occasion and a synchronization signal block (SSB);
the terminal device receiving at least one multimedia broadcast multicast service (MBMS) service transmission within a first time range based on the correspondence between the PDCCH monitor occasion and the SSB,
wherein the terminal device determining the correspondence between the PDCCH monitor occasion and the SSB comprises: for an m*S+nth PDCCH monitor occasion within the first time range, there is a correspondence between the m*S+nth PDCCH monitor occasion and an nth SSB; wherein m, S, and n are all integers, 0≤m≤X-1, S is a number of SSBs actually transmitted, 1≤n≤S, X is a number of MBMS service transmissions within the first time range.

2. The method according to claim 1, wherein the terminal device determining the correspondence between the PDCCH monitor occasion and the SSB comprises: for n*X+mth to (n+1)*Xth PDCCH monitor occasions within the first time range, there is a correspondence between the n*X+mth to (n+1)*Xth PDCCH monitor occasions and an n+1th SSB; wherein n, X, and m are all integers, 0≤n≤S-1, S is a number of SSBs actually transmitted, 1≤m≤X, X is a number of MBMS service transmissions within the first time range.

3. The method according to claim 2, wherein the n*X+mth to (n+1)*Xth PDCCH monitor occasions respectively correspond to 1st to Xth MBMS service transmissions associated with the n+1th SSB.

4. The method according to claim 1, wherein the method further comprises: the terminal device determining a number of the PDCCH monitor occasion within the first time range.

5. The method according to claim 4, wherein the first time range comprises K radio frames, where K is an integer, and K≥1; numbers of starting radio frames of the K radio frames satisfy SFN mod K=0, where SFN represents the numbers of the starting radio frames; the PDCCH monitor occasions in the K radio frames are numbered in ascending order.

6. The method according to claim 5, wherein a value of the K is predetermined through a protocol or configured through a network.

7. The method according to claim 4, wherein: the first time range is a DRX activation time of a DRX period; PDCCH monitor occasions in the DRX activation time are numbered in ascending order; or the first time range is the DRX period, and the DRX period comprises a DRX activation time and a DRX inactivation time; PDCCH monitor occasions in the DRX period are numbered in ascending order.

8. The method according to claim 4, wherein the first time range is an MBMS period, and the MBMS period is used to transmit MBMS services or to configure MBMS resource positions; PDCCH monitor occasions in the MBMS period are numbered in ascending order.

9. The method according to claim 8, wherein a configuration information of the MBMS period is agreed through a protocol or configured through a network.

10. The method according to claim 9, wherein the configuration information of the MBMS period comprises at least one of the followings: a third information, wherein the third information is used to determine a time length of the MBMS period; a fourth information, wherein the fourth information is used to determine a starting position of the MBMS period.

11. The method according to claim 4, wherein the first time range is the time range corresponding to the second time window; PDCCH monitor occasions in the second time window are numbered in ascending order.

12. The method according to claim 11, wherein the second time window is used to transmit a new transmission of multiple data and at least one retransmission corresponding to each of the multiple data.

13. The method according to claim 11, wherein the second time window is used to transmit a new transmission of data and at least one retransmission corresponding to the data.

14. The method according to claim 11, wherein the second time window is used to transmit a new transmission of data or a retransmission of the data.

15. The method according to claim 11, wherein the new transmission of data and at least one retransmission corresponding to the data are transmitted through multiple second time windows, and the multiple second time windows are included in a third time window.

16. The method according to claim 4, wherein the first time range comprises MBMS subframes and/or non-MBMS subframes, the MBMS subframes refer to subframes used to transmit MBMS services, and the non-MBMS subframes refer to subframes used to transmit non-MBMS services; PDCCH monitor occasions on all subframes within the first time range are consecutively numbered; or PDCCH monitor occasions on the MBMS subframes within the first time range are consecutively numbered.

17. The method according to claim 4, wherein the method further comprises: the terminal device receiving a configuration information of a first PDCCH resource, wherein the first PDCCH resource is used to transmit an MBMS service; wherein a period of the first PDCCH resource and a DRX period have an integer multiple relationship, and a starting position of a DRX activation time of the DRX period is aligned with a starting position of the period of the first PDCCH resource.

18. A data retransmission apparatus, comprising: a determination unit configured to determine a correspondence between a PDCCH monitor occasion and an SSB; a receiver configured to receive at least one MBMS service transmission within a first time range based on the correspondence between the PDCCH monitor occasion and the SSB,
wherein the determination unit is configured to determine the correspondence between the PDCCH monitor occasion and the SSB as follows: for an m*S+nth PDCCH monitor occasion within the first time range, there is a correspondence between the m*S+nth PDCCH monitor occasion and an nth SSB; wherein m, S, and n are all integers, 0≤m≤X-1, S is a number of SSBs actually transmitted, 1≤n≤S, X is a number of MBMS service transmissions within the first time range.

* * * * *